United States Patent [19]
Johnston et al.

[11] Patent Number: 5,641,549
[45] Date of Patent: Jun. 24, 1997

[54] CELLULARIZED POLYESTERS

[75] Inventors: Walter Francis Johnston, Akron; Donald Edward Richeson, North Canton; William George Perkins, Akron, all of Ohio

[73] Assignee: Shell Oil Company, Houston, Tex.

[21] Appl. No.: 572,382

[22] Filed: Dec. 14, 1995

Related U.S. Application Data

[63] Continuation of Ser. No. 402,807, Mar. 13, 1995, abandoned, which is a continuation of Ser. No. 142,264, Oct. 22, 1993, abandoned.

[51] Int. Cl.⁶ ........................................ C08L 67/02
[52] U.S. Cl. .................. 428/35.7; 428/36.92; 521/81; 521/94; 521/138; 525/165; 525/166
[58] Field of Search ........................ 525/165, 166; 428/35.7, 36.92; 521/81, 94, 138

[56] References Cited

U.S. PATENT DOCUMENTS

| | | | |
|---|---|---|---|
| 3,554,932 | 1/1971 | Overcashier | 521/138 |
| 3,960,807 | 6/1976 | McTaggart . | |
| 4,002,581 | 1/1977 | Dolce | 525/177 |
| 4,572,852 | 2/1986 | Gartland et al. . | |
| 4,981,631 | 1/1991 | Cheung et al. . | |
| 4,996,269 | 2/1991 | Richeson et al. . | |
| 5,023,137 | 6/1991 | Smith et al. . | |

*Primary Examiner*—Patricia A. Short
*Attorney, Agent, or Firm*—Kim Muller

[57] ABSTRACT

This invention is a composition, a kit to prepare the composition, cellular sheet made from the composition and thermoformed articles made from the sheet, in which the composition comprises polyethylene terephthalate, sufficient inert gas to give a sheet density of 0.4 to 1.25 gm/cc, a polytetrafluoroethylene nucleating agent and optionally a polyolefin additive and a heat stabilizer.

19 Claims, No Drawings

CELLULARIZED POLYESTERS

This is a continuation of application Ser. No. 08/402,807, filed Mar. 13, 1995, now abandoned, which is a continuation of Ser. No. 08/142,264, filed Oct. 22, 1993, now abandoned.

BACKGROUND

This invention relates to nucleating agents to aid crystallization of polyesters and to articles made of cellularized compositions of the crystalline polyesters.

Polyesters, especially polyethylene terephthalate (PET), are widely used for articles in which properties of nontoxicity, good heat stability, resistance to deformation and ease of manufacture are important. PET is very useful for dual ovenable (i.e., usable in conventional ovens as well as microwave ovens) food packages and trays. Incorporating gas into the polyester to provide a cellular structure also has advantages in many applications, and especially dual ovenable food trays. The cellular structure not only reduces the weight of polyester needed in sheet and trays, but also provides heat insulation. Food trays and other articles are generally made from polyester by thermoforming. In one process of thermoforming, a sheet of polyester is preheated to its deformation temperature and made to conform to the contours of a mold by vacuum assist (vacuuming it into the mold), air pressure assist (blowing it into the mold), plug assist and matched mold assist (forcing it into the mold). It is essential that the polyester be partially crystalline to maintain good dimensional stability, stiffness and other desirable properties. Crystallinity of about 15 to 32 percent after forming is customary. It is a happy coincidence that polyesters crystallize upon heating, so that the thermoforming step plus a period of heat treatment (holding the article at the molding temperature for a time) results in the desired crystallinity. Of course, the polyester must be properly selected, and have added to it a suitable crystallization nucleation agent, i.e. an agent (usually particles) which initiates and provides a starting point on which crystallites can form. Moreover, it is necessary to provide some improvement in impact strength to prevent or at least reduce shattering. This is usually achieved by adding a small amount of a polyolefin component to the polyester blend.

Gas addition to obtain a cellular structure is conveniently accomplished in an extruder used to form the sheet. While other methods can be used, the injection of gas (nitrogen is preferred for cost, availability, convenience and environmental friendliness) into the barrel of the extruder is customary. However, the composition and conditions must be carefully selected and controlled to get the desired result. Extruded sheet is normally fairly thin, for example about 0.030 inch. It is necessary, therefore, to have many very small bubbles; large bubbles result in a rough surface and, if too large, in holes in the sheet. Extrusion speed is also important. Extrusion cannot be faster than bubble formation. Since bubbles form around seed particles, a suitable nucleating agent of sufficiently small particle size can speed bubble formation, extrusion and thermoforming.

While adequate crystallinity (i.e. about 25 percent) can be obtained by thermoforming, especially with heat treatment in the mold, neither satisfactory impact strength nor economical cycle times can be achieved. Nor does extended heat treatment (i.e. 30 to 60 seconds depending upon temperature) give adequate crystallinity for easy release of a part from the heated mold. These are not new problems, and the industry has come a long way in overcoming the limitations. It is known to add polyolefins and inorganic nucleating agents, or to add only polyolefins, such as polyethylene or polypropylene, to speed crystallization and improve impact strength. There is, however, a never ending quest for yet better processing and product properties. Economics dictate ever faster cycle times. A nucleating agent that allows fast bubble formation and fast cycle time is, therefore, very desirable. We have discovered a nucleation/bubble formation system that accomplishes that.

SUMMARY

We have found that addition of polytetrafluoroethylene (PTFE) to a polyolefin additive for polyethylene terephthalate results in excellent bubble formation in foamed sheet and in rapid crystallization of the sheet in molding.

This invention is a composition, and a kit to provide a composition, to provide rapid crystallization of and bubble formation in PET suitable for use in thermoforming articles for application in high temperature service such as ovenable food trays. In one aspect this invention is a composition comprising: (a) a major portion of polyethylene terephthalate having an intrinsic viscosity from about 0.65 to about 1.4; (b) sufficient bubbles of inert gas to provide a cellular sheet with a density of about 0.04 to 1.25 gm/cc, (c) from 0.01 to 5 weight percent PTFE, and (d) optionally from about 0.5 to about 10 weight percent of a polyolefin with repeat units derived from monomers containing 2 to 6 carbon atoms.

In another aspect the invention is a kit for making cellular crystalline PET sheet, comprising; (a) a component of predetermined weight comprising a major amount of polyethylene terephthalate having an intrinsic viscosity (IV) from about 0.65 to 1.4; and component (b) a component comprising an amount of PTFE that when added to component (a) results in a blend of about 0.01 to 5 weight percent by PTFE in the blend, and optionally an additional component in (b) comprising an amount of a polyolefin with repeat units derived from monomers containing 2 to 6 carbon atoms to provide from about 0.5 to about 10 weight percent when mixed with component (a).

In another aspect the invention is a process for making a thermoformed, thin walled article, made from the composition described above, and the article so made.

DETAILED DESCRIPTION

This invention is a polyester composition suitable for, and a process for, rapidly crystallizing and cellularizing polyethylene terephthalate (PET) sheet and, in another embodiment, articles made from the cellular sheet, comprising polyethylene terephthalate and a nucleating or bubble formation agent. Optionally, the polyester composition also contains a heat stabilizer. Other aspects of this invention include a process for making sheet and formed articles made from the composition described above.

Of known thermoplastic, crystallizable polyesters, polyethylene terephthalate (PET) has very desirable properties of good high temperature dimensional stability, chemical, oil, and solvent resistance and the ability to pass microwave radiation without absorbing or reflecting it. These properties make it excellent for use in high temperature food containers.

PET is made by known polymerization techniques from terephthalic acid or its lower alkyl ester (dimethyl terephthalate) and ethylene glycol. The terephthalic acid or dimethyl terephthalate is either esterified or transesterified and then polycondensed with ethylene glycol to a high molecular weight polymer. The PET of this invention is comprised of repeat units derived from the terephthalic acid or dimethyl terephthalate and ethylene glycol. The PET may be modified to contain a small amount of repeat units derived from diacids other than terephthalic acid and/or glycols other than ethylene glycol. For example, small amounts of isophthalic acid or a naphthalene dicarboxylic acid (or the corresponding diesters) can be used. Also, diols containing from 3 to 8 carbon atoms, such as 1,4-butane diol, can be used as part of the glycol component content. Normally, no more than about five (5) weight percent of the repeat units should be other than terephthalic acid (or dimethyl terephthalate) and ethylene glycol.

The PET (or modified PET) will have an intrinsic viscosity (I.V.) of a least about 0.6 dl/g, and in most cases an I.V. of between 0.65 to about 1.4 dl/g. It is preferred that the I.V. be in the range of 0.8 to 1.4 dl/g and especially preferred that it be above 0.9 dl/g. Intrinsic viscosity is a measure of molecular weight and defined as the limit of the fraction in v/C as C, the concentration of the polymer solution, approaches 0, in which v is the inherent viscosity that is measured at several different concentrations in a 60/40 mixed solvent of phenol and tetrachloroethane at 30° C.

The second essential ingredient of the composition of this invention is a component that acts to nucleate rapid crystallization of the PET (when heated from a low temperature and when cooled from the molten state) and to initiate small bubble formation upon gas addition to the molten PET. This component must not significantly reduce the impact strength of the composition. It has been found that polytetrafluoroethylene (PTFE) of sufficiently small particle size will do that. Small particle polytetrafluoroethylene (commonly known as PTFE). Teflon™, a product of the E. I. du Pont de Nemours & Co. and also abbreviated as PTFE) of sufficiently small particle size is very suitable and meets all the requirements described above. Other manufactures of polytetrafluoroethylene include Daikin Kogyo (Polyflon), Hoechst Celanese (Hostaflon), ICI (Fluon) and Ausimont (Algoflon and Halon). It is necessary that the polytetrafluoroethylene be a powder (e.g. less than 20 micron particles) for use in the composition of this invention. It is preferable that the particle be as small as possible; particles less than about 12 microns, i.e. 7 to 12 microns, work well. In order to produce fine particles it is sometimes necessary that the additive be ground or otherwise mechanically reduced in size. Since ordinary PTFE tends to agglomerate upon mechanical working or grinding it is customary to use or produce lower molecular weight polymer for a small particle size product. It is possible to reduce PTFE molecular weight by irradiating the polymer, or to polymerize under special conditions. PTFE of small particle size available from Ausimont is irradiated. Some grades of PTFE available from Dupont, such as the MP grades, are of sufficiently small particle size without irradiation; these are generally preferred. For some applications, such as disposable dual ovenable trays, the irradiated grades do not meet FDA standards. In those applications the non-irradiated PTFE is required.

In addition to PTFE, it is very desirable that the composition also contain a polyolefin produced from monomers having from 2 to 6 carbon atoms. The polyolefin, while increasing nucleation and perhaps bubble formation, is very influential in providing good thermoforming mold release properties. Suitable polyolefin monomers include low density polyethylene, high density polyethylene, linear low density polyethylene, polypropylene, polyisopropylene, polybutylene, polypentene and polymethylpentene. The polyolefin is present at 0.5 to about 10 percent by weight and preferably about 0.5 to 5 percent by weight. Preferred polyolefins are linear low density polyethylene such as that made by Exxon Chemical Co. as trade-named product ESCORENE LL 1001.59 and DOWLEX 2045 and 2035 made by The Dow Chemical Co. Since it is desirable that the polyolefin be completely mixed with the polyester, the polyolefin may be added during the sheet extrusion step. The polyolefin is carried through the extruder as an inert material and is homogeneously mixed with the PET. It is also possible to mix the polyolefin by other mechanical means. Extruder mixing is preferable when using separated packages of polyester and additives as described below.

The composition of this invention will also optionally contain one or more heat stabilizers. A heat stabilizer is especially desirable if the composition is to be used to make an article for use in high temperature service, as for example as an ovenable food container or tray. An effective heat stabilizer will provide protection to the composition at temperatures associated with the use (e.g. 200° C.) and forming processes to which the composition may be subjected. Useful heat stabilizers are antioxidant compounds.

Representative heat stabilizers include alkylated substituted phenols, bisphenols, thioacrylates, aromatic amines, organic phosphites, and polyphosphites. Particular aromatic amines include primary polyamines, diaryl amines, bisdiarylamines, alkylated diarylamines, ketone diarylamine condensation products, aldehyde-amine condensation products and aldehyde imines. Suitable polyphenols include, tetrakis(methylene-3(3,5-di-t-butyl-4-hydroxy phenyl)-propionate)methane and 1,3,5-trimethyl-2,4,6-tris(3,5-di-t-butylybenzyl) benzene. Ethanox 330™ (a registered trademark of Ethyl Corporation) is a useful commercial stabilizer.

An effective amount of stabilizer will generally be within the range of about 0.005 to about 2 percent by weight based on the total weight of the polyester composition, and usually between about 0.01 to 0.5 percent. The amount will be determined by the amount and effectiveness of stabilization needed, severity of the application and solubility.

Thus, the composition of this invention, suitable for cellular sheet and articles made from such sheet will have a major portion of PET having an I.V. of 0.65 to 1.4 dl/g, 0.01 to 5 weight percent PTFE having a particle size less than about 20 microns and preferably less than about 12 microns, 1 to 10 weight percent polyolefin, preferably LLDPE, and about 0.005 to 2 weight percent of a heat stabilizer such as Ethanox 330™. A preferred composition contains 0.1 weight percent PTFE, 1.1 weight percent LLDPE, 0.006 weight percent Ethanox 330™, in PET having an I.V. about 0.95 dl/g.

Pigments and colorants, preferably non-nucleating compounds, can also be added to the composition. For example, titanium dioxide can be used to produce a white product. Other colorants include phthalocyanine blue, solvent red 135, and disperse yellow 64 (CAS No. 10319-14-9).

The compositions can be easily made by blending the PET with the nucleating agent and heat stabilizer, colorant and other additives prior to melting for extrusion. Such blending will be completed at temperatures above the melting point of PET (260° C. for homopolymer) and generally between about 260° to 315° C. A temperature of between about 280° C. and 300° C. is very suitable. To achieve the desired complete dispersion of the additives throughout the PET, in commercial operations, blending is generally carried out in an extruder or extruders that provide sufficient shear to give adequate mixing.

It is often expedient to package the polyester and the nucleating agent (and perhaps other additives) separately. Since polyester is sold for a variety of applications, some requiring nucleating agent and some not, separate packaging provides more in tailoring the additive components to the specific application. Separate packaging also allows more variety in selection of the nucleating agent and other additives (such as heat stabilizer). Moreover, it is frequently required that the PET be dried before extrusion and drying (as with hot air) may be at higher temperatures than suitable for components of the additive package.

Thus the present invention, in one aspect is a kit of separate packages for polyester and nucleating and additive packages. It is preferred that the polyester be packaged without additives in various size containers ranging from gaylords to railcars. Typically, polyesters are provided in pellet or cube form. Separate packages of additives are prepared to match the size of the polyester package, for example an additive package comprising of 0.109 pounds of polytetrafluoroethylene nucleating agent is matched with 100 pounds of polyester to provide a 0.1 percent by weight blend. Of course, for 50 pounds of polyester, half the nucleant amount will be packaged. The optional polyolefin additive may also be added with the nucleant package. Thus, for a desired blend of 1.0 percent polyolefin and 0.1 weight percent nucleant, a package to match 100 pounds of PET would comprise 1.09 pounds of polyolefin and 0.109 pounds polytetrafluoroethylene. If polyolefin is used it is preferred for the heat stabilizer to be blended into the polyolefin before it is mixed with the PET. For example about 0.6 weight percent (based on total blend weight) Ethanox™ 330 (a stabilizer) could be used. A very suitable nucleant package would contain PTFE, LLPE and a heat stabilizer, blended together in an extruder. The melted LLPE would act as a carrier for the PTFE particles, which would be released when the nucleant package is remelted for mixing with PET and extrusion into sheet.

The contents of these packages are mixed on the site of use, or as required. Since it is important that the components be well mixed, it is preferred that they be mixed by melt blending as described above and preferably in an extruder or other shear mixer. When used for film and sheet, the components are mechanically blended prior to introduction into the film extruder and the melted blend is extruded through an elongated die onto a moving roll or carrier, cooled to quench and otherwise prepared for further use. It is especially convenient to blend the components of the kit in this way. An alternative method involves the preliminary step of masterbatching approximately one quarter by weight of polyolefin with three quarters of PET. As will be appreciated, there are numerous ways in which the kit can be configured within the scope of this invention.

The cellular sheet (and film) is made by mixing at least one inert gas with molten polyester in a melt or plasticating extruder. The gas may be any gas that does not chemically react with the polyester at elevated processing temperatures. Suitable gases include nitrogen, carbon dioxide, helium, argon and krypton. Nitrogen is preferred. In the extruder the screw drive pushes the molten resin containing discrete gas cells through a metal die that shapes the sheet into the desired form. Generally single screw extruders are used, but multiple screw, such as twin or tandem screw, machines may also be used.

In a single screw plasticating extruder, resin (as solid particles) is fed into the extruder by gravity from a hopper into the screw channel (or solids conveying zone) where it is mixed, compressed, heated and conveyed along the channel by mechanical action of the screw. The barrel of the extruder is heated electrically or by fluid heat exchange. The resin is heated above its melting point and melted in a melting zone. From the melting zone where the resin is melted and further mixed, it is pumped into the melt conveying zone of the extruder. It is in this zone, with the resin well above its melting point, that gas is injected. Sufficient agitation is needed to obtain essentially homogeneous dispersion of gas bubbles. The molten resin in the melt conveying zone is at a lower temperature than in the melting zone and accordingly has higher viscosity. A blister ring (or collar) located upstream of the gas injection point prevents gas from back mixing through the melting zone and escaping through the feed hopper. The molten resin is pumped into a metering pump and extruded through the sheet die. The metering pump and extrusion die are maintained at a lower temperature than the barrel around the melt conveying zone to minimize rupture and diffusion of gas bubbles in the resin. The sheeting die is approximately rectangular with a narrow slit. Upon exiting the die resins will swell or expand somewhat, the extent dependent upon the melt temperature, the length-to-width ratio of the die, and the sheer stress at the die walls. Circular dies are sometimes used and the extruded tube slit to form flat sheet. The cellular sheet is cooled without stretching by cold air, immersion in a cooled fluid bath or passage over temperature-controlled rolls. The cellular sheet is essentially amorphous.

Cellular sheet, so produced, contains sufficient gas cells to give it a density in the range of 0.04 to about 1.25 gm/cc, and more typically a density of 0.70 to 1.15 gm/cc.

In another aspect, this invention is a process for producing heat set, thin-walled articles from cellular polyester by thermoforming. Thin-walled as used in this context generally means articles having wall thickness less than 1 millimeter (ca. 40 mils). Greater thickness is acceptable if sufficient means is used to uniformly heat the sheet without excess crystallization. The complete technique consists of the following steps:

1. Forming a substantially amorphous sheet from the homogeneously blended polyester/additive composition.
2. Preheating the sheet until it softens and positioning it over the mold.
3. Drawing the preheated sheet onto the heated mold surface,
4. Heat-setting the formed sheet by maintaining sheet contact against the heated mold for sufficient time to partially crystallize the sheet.
5. Stripping the part out of the mold cavity. The sheet is customarily quenched immediately after exiting the extruder die to reduce crystallization since excess crystallization makes it difficult to thermoform.

An alternative method, sometimes known as a "melt-to-mold" process involves the steps outlined above except in steps 1 and 2 the extruded sheet (maintained above its glass transition temperature) is passed directly onto the mold surface as in step 3, eliminating the need to reheat the formed sheet. The nucleant system of this invention helps induce sufficiently rapid crystallization on cooling as well as on heating. In the first outlined technique, it is necessary that the polyester blend rapidly crystallize on heating. Our invention is capable of use in thermoforming by either means.

Amorphous as used in this description means a sheet having a level of crystallinity low enough to enable thermoforming with satisfactory mold definition and part formation. In currently available thermoforming processes, the level of crystallinity should not exceed about 10 percent.

Preheating the substantially amorphous sheet prior to positioning it over the thermoforming mold is necessary to achieve the very short molding times required for viable commercial operation. Generally a 5 to 12 second cycle time is acceptable. The sheet must be heated above its glass transition temperature (Tg) and below the point it sags excessively during positioning over the mold cavity. In the melt-to-mold process the sheet is cooled from its melt temperature to the appropriate temperature. The preferred ranges of temperature is 220° to 160° C., and most preferably 220° to 170° C.

Any known thermoforming methods may be used, including vacuum assist, air assist, mechanical plug assist or matched-mold forming. The mold should be preheated to a temperature sufficient to achieve the degree of crystallinity desired. Selection of optimum mold temperature is dependent upon the type of thermoforming equipment, configuration and wall thickness of the formed articles and other factors. The operable range of mold temperatures is 150° to 215° C. The preferred range is 160° to 190° C.

Heat-setting is a term describing the process of thermally inducing partial crystallization without losing appreciable molecular orientation. Heat-setting is achieved by maintaining intimate contact of the film or sheet with the heated mold surface for sufficient time to achieve the desired level of crystallinity. Crystallinities of about 10 to about 40 percent are suitable. For containers used in high temperature food service, crystallinity should be above about 15 percent. It is preferred that crystallinity be in the range from 20 to 40 percent to give the excellent dimensional stability useful for most applications.

The term glass transition temperature means that temperature or temperature range at which a change in slope appears in the volume versus temperature curve for said polymer and defining a temperature below which the polymer exhibits a glassy characteristic and above which the polymer exhibits a rubbery characteristic. The glass transition (Tg) of polyethylene terephthalate in various states has been reported as follows: amorphous: 67° C.; crystalline: 81° C.; oriented and crystalline: 125° C.

Since a partially crystalline finished article is necessary for good dimensional stability at high temperature, knowledge of the degree of crystallinity or percent crystallinity is of considerable importance. Differential scanning calorimetry (DSC) is a convenient method of measuring percent crystallinity.

The terms crystallization temperature and crystallization onset are used interchangeably to mean the temperature or temperature range in which a regularly repeating morphology, brought about by a combination of molecular mobility and secondary bonding forces, is induced in a polymer over a molecular distance of at least several hundred angstroms.

ILLUSTRATIVE EMBODIMENTS

Example 1

Two rolls of cellularized sheet were made for themoforming. Both were 30 mils thick, produced at a rate of 13.5 feet per minute take up. To the first roll formulation (031693-1) was added 1.2 parts by weight of a nucleating composition. The nucleating composition was prepared by extruding together 7.857 pounds of NA-1 and 2.143 pounds of Ausimont PTFE designated XPH284. NA-1 is LLDPE (ESCORENE LL 1001.59 by Exxon Chemical co. plus 0.1 percent weight ETHANOX™ 330). This nucleant composition was dry blended before extrusion. After extrusion it was chopped into pellets of approximately 3.2 grams per 100 pellets in size.

This nucleant was added to a PET resin that had an I.V. of 0.95 (designated TTF 9552) in an amount 1.2 parts nucleant per 98.8 parts resin. The components were metered into the extruder at a rate to obtain the designated amounts. The second roll was a control (031693-2) using the NA-1 as a nucleant at a concentration of 3 parts NA-1 per 97 parts of resin by weight. A die opening of 12 mils by 30 inches wide at a rate of 50 rpm on the pump was used for extrusion.

The density of the sheet as measured during extrusion was acceptable at slightly less than 0.9 g/cc. Visual examination of the sheet of each roll showed the 031693-1 to be of smaller cells and more uniform cells than the 031693-2 sheet.

Trays were made of each of those rolls at various thermoforming conditions. Tests for crystallinity, density, bake at 400° F. (204° C.) and thickness were made.

Trays were thermoformed using both rolls for comparison. The preheat time was varied on the Comet thermoformer for the series and the mold kept at 320° F. (160° C.). The time in the mold was held at either 10 or 20 seconds for crystallization. Other conditions of thermoforming are shown in Table 1.

The results in Table 2 show that the sheet temperature for thermoforming must be greater than 275° F. (135° C.) for good release from the mold. At sheet temperatures of less than 275° F. (135° C.) poor release from the mold was evident for both 031693-1 and 031693-2.

All samples passed the 400° F. (204° C.) bake cycle test, even those with the lowest preheat temperature.

Impact testing was conducted on a DYNATUP falling dart tester. The load was measured at break. It took more load to break the tray bottoms of the 031693-1 than for the control (031693-2). Also, deflection of the sample before break is greater with the PTFE nucleant material.

Crystallinity level was 20 to 24 percent overall for both samples. The appearance of the sheet with PTFE nucleant (031693-1) is better in cell size and appearance, but has a rough surface similar to a fine sandpaper surface. The PTFE nucleant yields better and smaller cell size, slightly more strength, but no difference on bake at 400° F. (204° C.) or crystallinity.

During these tests the screens used in the extruder to prevent foreign material from the extruder became packed with PTFE. This can be solved by use of larger screens.

TABLE 1

TRAY PROPERTIES

| Preheat sec | Sheet Temp F. | sec. in 320 F. mold | Sheet No. | impact load* @ 77 F. | impact deflec.* @ 77 F. | impact energy* @ 77 F. | thickness, mils |
|---|---|---|---|---|---|---|---|
| 4 | 240 | 10 | 31693-1 | 23.16 | 0.12 | 147.2 | 24 |
| 6 | 275 | 10 | 31693-1 | 20.48 | 0.11 | 145.3 | 22 |
| 8 | 295 | 10 | 31693-1 | 23.64 | 0.12 | 144.5 | 23 |
| 10 | 340 | 10 | 31693-1 | 19.81 | 0.10 | 147.6 | 24 |
| 15 | 380 | 10 | 31693-1 | 19.81 | 0.10 | 147.2 | 25 |
| 20 | 425 | 10 | 31693-1 | 18.13 | 0.10 | 146.4 | 20 |
| 4 | 274 | 20 | 31693-1 | 20.81 | 0.10 | 147.7 | 24 |
| 6 | 310 | 20 | 31693-1 | 22.49 | 0.11 | 147.1 | 22 |
| 10 | 320 | 20 | 31693-1 | 17.45 | 0.09 | 146.8 | 24 |
| 15 | 420 | 20 | 31693-1 | 16.14 | 0.10 | 144.9 | 24 |
| 4 | 240 | 10 | 31693-2 | 16.11 | 0.09 | 146.3 | 25 |
| 6 | 280 | 10 | 31693-2 | 16.44 | 0.08 | 146.4 | 25 |
| 8 | 270 | 10 | 31693-2 | 15.44 | 0.08 | 148.3 | 25 |
| 10 | 350 | 10 | 31693-2 | 7.05 | 0.02 | 147.3 | 25 |
| 15 |  | 10 | 31693-2 | 14.16 | 0.08 | 146.5 | 26 |
| 20 | 450 | 10 | 31693-2 | 9.06 | 0.05 | 148.2 | 23 |
| 8 | 330 | 20 | 31693-2 | 12.76 | 0.07 | 146.9 | 24 |
| 10 | 375 | 20 | 31693-1 | 5.03 | 0.01 | 145.4 | 27 |

*Dynatup

TABLE 2

Tray Properties

| Preheat sec | Sheet Temp F. | sec. in 320° F. mold | Sheet No. | Cryst. DSC, % | Forming results | tray density, gm/cc |
|---|---|---|---|---|---|---|
| 4 | 240 | 10 | 31693-1 | 21.79 | poor release | 0.8771 |
| 6 | 275 | 10 | 31693-1 | 21.08 | poor release | 0.8812 |
| 8 | 295 | 10 | 31693-1 | 23.64 | OK rough | 0.8965 |
| 10 | 340 | 10 | 31693-1 | 23.10 | OK rough | 0.8026 |
| 15 | 380 | 10 | 31693-1 | 22.91 | OK rough | 0.7892 |
| 20 | 425 | 10 | 31693-1 | 21.69 | OK rough | 0.8558 |
| 25 | 460 | 10 | 31693-1 | — | won't form | — |
| 4 | 275 | 20 | 31693-1 | 23.86 | OK rough | 0.8409 |
| 6 | 310 | 20 | 31693-1 | 22.94 | OK rough | 0.8412 |
| 10 | 320 | 20 | 31693-1 | 22.23 | OK rough | 0.7650 |
| 15 | 420 | 20 | 31693-1 | 24.16 | OK rough | 0.7913 |
| 4 | 240 | 10 | 31693-2 | — | poor release | 0.8385 |
| 6 | 280 | 10 | 31693-2 | 22.93 | OK | 0.8027 |
| 8 | 270 | 10 | 31693-2 | — | OK, thin | 0.8340 |
| 10 | 350 | 10 | 31693-2 | 20.57 | OK, large cells | 0.7562 |
| 15 |  | 10 | 31693-2 | 23.93 | OK, large cells | 0.7343 |
| 20 | 450 | 10 | 31693-2 | — | sag, poor form | 0.9392 |
| 8 | 330 | 20 | 31693-2 | 20.07 | OK, large cells | 0.7534 |
| 10 | 375 | 20 | 31693-1 | 22.44 | OK, large cells | 0.7238 |

Example 2

Five samples of sheet with various nucleant compositions were extruded on a 2½ inch John Brown extruder. Specifically, these sheets were (1) a control sheet, [052193-1], having 3 weight percent NA-1 nucleant, (2) sheet having 0.1 weight percent PTFE and 1.1 weight percent NA-1 mixed into PET (TTF 9552) during extrusion, (3) sheet having 0.3 weight percent PTFE and 1.1 weight percent NA-1 mixed into PET (TTF 9552) during extrusion, [052193-3], (4) sheet having 0.1 weight percent PTFE and 1.1 weight percent NA-1 dry mixed into TTF 9552 resin [052193-4] and finally (5) sheet having 0.3 weight percent PTFE and 1.1 percent NA-1 dry mixed into TTF 9552 resin [052193-5]. TTF 9552 is a polyethylene terephthalate having an I. V. of 0.95 dl/gm.

Trays from the sheet rolls were thermoformed on a Comet thermoformer. The thermoforming cycle included 10 seconds preheat, 10 seconds forming and holding in a 320° F. (160° C.) mold, and cooling. The trays were stamped out using a steel rule die cutter and an USM Emhart Hytronic cutting machine model B1. These trays were tested for average weight of a tray, density of trays and sheets, bake cycle at 400° F. (204° C.), water fill test, Dynatup impact [at −20° F. (−29° C.) and room temperature], tensile strength and elongation in the machine and transverse directions, Young's modulus, microscopic examination, thickness, crystallinity via DSC of the trays, and melt viscosity.

Extrusion parameters used to make the five rolls of sheet are as follows: The metering pump speed was set to give 160 pounds per hour output. This was set to duplicate the fast speed needed for economic commercial extrusions. The take up rate for the sheet at that output rate was 9.8 fpm. One hundred (100) feet of each of the five samples was made for further testing. Sections of the roll were cut for thermoforming of trays. The thermoforming cycle was set at 10 seconds in the oven to achieve 300° F. (149° C.) preheat temperature of the sheet. The mold [320° F. (160° C.)] was raised and the sheet was thermoformed to a tray, holding the part in the mold for 10 seconds. The tray was cooled and trimmed using a steel rule die cutter. Nitrogen at a back pressure of about 3250 psi was injected into the melt at a rate of about 2.5 standard liters per hour. Melt temperature in the extruder was about 510° F. (266° C.). Extruder pressure ahead of the die was between 2500 and 2780 psi.

Table 3 lists density data obtained after the extrusion and thermoforming of the trays. The control formulation has the highest density in both sheet and trays. The density of the PTFE is 2.28 gm/cc, so the addition of the heavier material would be expected to cause the overall density to increase.

Because of better gassing tendency of the PTFE containing sheet, its density is actually lower after extrusion. Also, the thermoforming operation lowers the density due to expansion of the gas cells. In each case the density of the tray is less than the density of the sheet from which it was formed.

Further, it is clear that the density of the sheet with 0.3 weight percent PTFE (see sample 052193-3 and 052193-5 in Table 3) is lower than the density of the sheet with 0.1 weight percent PTFE (sample 052193-2 and 052193-4).

Table 4 lists the impact data for the trays as measured on a Dynatup testing instrument at room temperature and −20° F. (−29° C.). PTFE at 0.1 weight percent (sample 052193-2 and 052193-4) improves impact at both room temperature and at −20° F. (−29° C.). PTFE at 0.3 weight percent (samples 052193-3 and 052193-5) improves the impact at room temperature but lowers the impact at −20° F. (−29° C.). This may be caused by poorer dispersion of PTFE at the higher concentration.

Table 5 gives the tensile strength, elongation and Young's Modulus for the sheet in both the machine direction, and the transverse direction for the trays. From the table it can be seen that for the PTFE containing sheet, the tensile strength is higher and the elongation is less.

Microscopic analysis of the trays revealed that the gas cells in the control tray (052193-1) were larger than the other samples. The largest gas cells in the field of magnification were measured with light passing through the tray and a magnification of 30×. The cells were elliptical with average sizes as follows:

052193-1—19.6×38.4 mils
052193-2—10.6×19.2 mils
052193-3—11.2×16.8 mils
052193-4—12.6×14.6 mils
052193-5—11.2×20.2 mils All of the trays had both large and small gas cells with the smallest being less than 1 mil diameter and difficult to measure with a stereo scope.

Examination of the surface of the sheets and the trays revealed that the control (052193-1) had more "craters" than the other four samples. The "roughness" of the surface may be caused by the walls of the craters protruding from the surface.

In oven testing [½ hour at 400° F. (204° C.)], none of the samples exhibited any odor or color change or distortion. All five tray samples had suitable oven aging characteristics. The five trays for each roll were filled with water and examined for leaks after 24 hours. None had any leakage.

TABLE 3

Tray Densities

| Sample No. | Sheet Density gm/cc | Tray Density gm/cc |
|---|---|---|
| 52193-1 | 0.9936 | 0.9023 |
| 52193-2 | 0.9534 | 0.8432 |
| 52193-3 | 0.9457 | 0.8121 |
| 52193-4 | 0.9390 | 0.8172 |
| 52193-5 | 0.9385 | 0.8049 |

TABLE 4

Impact Tests (Dynatup) 5 × 5 × 1 inch Trays

| Sample | Load (Lbs) | Deflection (inches) | Impact, in-lbs. | Test temp. °F. | Thickness (mils) |
|---|---|---|---|---|---|
| 52193-1 | 19.45 | 0.11 | 157.2 | −20 | 20.8 |
| 52193-2 | 23.05 | 0.13 | 157.2 | −20 | 21.8 |
| 52193-3 | 18.53 | 0.11 | 157.3 | −20 | 23.4 |
| 52193-4 | 22.74 | 0.13 | 157.1 | −20 | 22.4 |
| 52193-5 | 14.86 | 0.09 | 156.5 | −20 | 22.2 |
| 52193-1 | 21.15 | 0.11 | 157.6 | 74 | 20.8 |
| 52193-2 | 23.37 | 0.12 | 157.5 | 74 | 21.8 |
| 52193-3 | 25.03 | 0.12 | 157.5 | 74 | 23.4 |
| 52193-4 | 24.76 | 0.12 | 156.7 | 74 | 22.4 |
| 52193-5 | 25.03 | 0.12 | 157.5 | 74 | 22.2 |

TABLE 5

Mechanical Properties

| Sample | Young's modulus psi | Tensile strength psi | Elongation % | Thickness (mils) |
|---|---|---|---|---|
| Trays | | | | |
| 52193-1 | 84850 | 2945 | 7.57 | 18.25 |
| 52193-2 | 91970 | 3523 | 7.03 | 19.5 |
| 52193-3 | 78530 | 2855 | 6.93 | 20.5 |
| 52193-4 | 80270 | 2971 | 6.88 | 21.75 |
| 52193-5 | 86780 | 3353 | 7.62 | 20.6 |
| Sheet (Transverse direction) | | | | |
| 52193-1 | 91240 | 2428 | 5.10 | 27.9 |
| 52193-2 | 105000 | 3059 | 4.38 | 29.0 |
| 52193-3 | 102300 | 2948 | 4.50 | 32.0 |
| 52193-4 | 104100 | 2957 | 4.57 | 29.7 |
| 52193-5 | 106900 | 2965 | 4.42 | 31.6 |
| Sheet (Machine direction) | | | | |
| 52193-1 | 106000 | 2990 | 5.28 | 28.5 |
| 52193-2 | 111900 | 3386 | 4.74 | 29.4 |
| 52193-3 | 106900 | 3168 | 4.27 | 29.2 |
| 52193-4 | 110400 | 3321 | 4.55 | 30.0 |
| 52193-5 | 108600 | 3317 | 4.70 | 30.0 |

The representative embodiments are illustrative of the invention which has the full scope defined by the attached claims.

What is claimed is:

1. A thin-walled article thermoformed from a cellular sheet, the composition of which comprises: (a) a major portion of polyethylene terephthalate having an intrinsic viscosity from about 0.65 dl/g to about 1.4 dl/g; (b) sufficient bubbles of inert gas to provide the cellular sheet with a density of about 0.04 gm/cc to about 1.25 gm/cc, (c) from about 0.01 weight percent to about 5 weight percent, based on total composition weight, polytetrafluoroethylene having a particle size of from about 7 microns to about 12 microns (d) from about 0.5 weight percent to about 10 weight percent, based on total composition weight, of a polyolefin selected from the group consisting of polyethylene and polypropylene, and (e) an effective amount of a heat stabilizer; wherein the article has a crystallinity of from about 15 percent to about 32 percent.

2. The article of claim 1 in which the inert gas is selected from the group consisting of nitrogen and carbon dioxide, and the polyolefin is polyethylene.

3. The article of claim 2 in which component (a) has an intrinsic viscosity in the range of 0.8 to 1.4 dl/g, and component (c) is present in the range of 0.1 weight percent to 3 weight percent, based on total composition weight.

4. The article of claim 3 in which sufficient inert gas is used to provide a cellular sheet with a density of from about 0.07 gm/cc to about 1.15 gm/cc, and component (d) is a linear low density polyethylene, present at from about 0.5 to about 5 weight percent, based on total composition weight.

5. The article of claim 4 in which component (a) has an intrinsic viscosity above 0.9 dl/g.

6. The article of claim 5 in which the article is a food container, having a crystallinity of from about 15 percent to about 35 percent.

7. A process for making a heat set, partially crystalline, thin-walled article from a cellular sheet which comprises thermoforming a substantially amorphous cellular sheet comprising: (a) a major portion of polyethylene terephthalate having an intrinsic viscosity from about 0.65 dl/g to about 1.4 dl/g; (b) sufficient bubbles of inert gas to provide a cellular sheet with a density of about 0.04 gm/cc to about 1.25 gm/cc, (c) from about 0.01 weight percent to about 5 weight percent, based on total composition weight, polytetrafluoroethylene having a particle size of from about 7 microns to about 12 microns, (d) from about 0.5 weight percent to about 10 weight percent, based on total composition weight, of a polyolefin selected from the group consisting of polyethylene and polypropylene, and (e) an effective amount of a heat stabilizer.

8. The process of claim 7 in which the inert gas is selected from the group consisting of nitrogen and carbon dioxide, and the polyolefin is polyethylene.

9. The process of claim 8 in which component (a) has an intrinsic viscosity in the range of 0.8 to 1.4 dl/g, and component (c) is present in the range of 0.1 weight percent to 3 weight percent, based on total composition weight.

10. The process of claim 9 in which sufficient inert gas is used to provide a cellular sheet with a density of from about 0.07 gm/cc to about 1.15 gm/cc, and component (d) is a linear low density polyethylene, present at from about 0.5 to about 5 weight percent, based on total composition weight.

11. The process of claim 10 in which component (a) has an intrinsic viscosity above 0.9 dl/g.

12. The process of claim 11 wherein the thermoforming is carried out in a heated mold for a time sufficient to provide an article having a crystallinity of from about 15 percent to about 35 percent, and the article produced is a food container.

13. A cellular polyethylene terephthalate sheet composition consisting essentially of:

(a) a major portion of polyethylene terephthalate having an intrinsic viscosity from about 0.65 dl/g to about 1.4 dl/g;

(b) sufficient bubbles of inert gas to provide a cellular sheet with a density of about 0.04 gm/cc to about 1.25 gm/cc;

(c) polytetrafluoroethylene having a particle size of from about 7 microns to about 12 microns, and present in an amount of from about 0.01 weight percent to about 5 weight percent, based on total composition weight;

(d) polyethylene, present in an amount of from about 0.5 weight percent to about 10 weight percent, based on total composition weight; and (e) an effective amount of a heat stabilizer.

14. The composition of claim 13 in which the inert gas is selected from the group consisting of nitrogen and carbon dioxide.

15. The composition of claim 14 in which component (a) has an intrinsic viscosity in the range of 0.8 to 1.4 dl/g.

16. The composition of claim 15 in which component (c) is present in the range of 0.1 weight percent to 3 weight percent, based on total composition weight.

17. The composition of claim 16 in which component (d) is a linear low density polyethylene, present at from about 0.5 to about 5 weight percent, based on total composition weight.

18. The composition of claim 17 in which sufficient inert gas is used to provide a cellular sheet with a density of from about 0.07 gm/cc to about 1.15 gm/cc.

19. The composition of claim 18 in which component (a) has an intrinsic viscosity above 0.9 dl/g.

* * * * *